(12) United States Patent
Nielsen et al.

(10) Patent No.: US 10,306,215 B2
(45) Date of Patent: May 28, 2019

(54) OBJECT DISPLAY UTILIZING MONOSCOPIC VIEW WITH CONTROLLED CONVERGENCE

(71) Applicant: MICROSOFT TECHNOLOGY LICENSING, LLC, Redmond, WA (US)

(72) Inventors: Soren Hannibal Nielsen, Redmond, WA (US); Jonathan Hoof, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 317 days.

(21) Appl. No.: 15/405,375

(22) Filed: Jan. 13, 2017

(65) Prior Publication Data

US 2018/0035104 A1 Feb. 1, 2018

Related U.S. Application Data

(60) Provisional application No. 62/369,150, filed on Jul. 31, 2016.

(51) Int. Cl.
| | |
|---|---|
| *H04N 13/00* | (2018.01) |
| *H04N 13/361* | (2018.01) |
| *H04N 13/111* | (2018.01) |
| *H04N 13/128* | (2018.01) |
| *H04N 13/167* | (2018.01) |
| *H04N 13/383* | (2018.01) |
| *H04N 13/366* | (2018.01) |

(Continued)

(52) U.S. Cl.
CPC ......... *H04N 13/361* (2018.05); *H04N 13/111* (2018.05); *H04N 13/128* (2018.05); *H04N 13/167* (2018.05); *H04N 13/359* (2018.05); *H04N 13/366* (2018.05); *H04N 13/383* (2018.05); *G06T 11/60* (2013.01)

(58) Field of Classification Search
CPC .. H04N 13/128; H04N 13/183; H04N 13/361; H04N 13/383
USPC .......................................................... 348/51
See application file for complete search history.

(56) References Cited

U.S. PATENT DOCUMENTS

| | | | |
|---|---|---|---|
| 8,514,225 | B2 | 8/2013 | Genova |
| 2004/0238732 | A1 | 12/2004 | State et al. |
| 2006/0028543 | A1 | 2/2006 | Sohn et al. |

(Continued)

OTHER PUBLICATIONS

Hua, et al., "Augmented Reality: Easy on the Eyes", In Journal of Optics and Photonics, vol. 26, Feb. 2015, pp. 26-33.

(Continued)

*Primary Examiner* — Jeffery A Williams
(74) *Attorney, Agent, or Firm* — Alleman Hall Creasman & Tuttle LLP (57) ABSTRACT

Aspects of the technology described herein can insert a 2D object into a 3D environment utilizing a monoscopic view with controlled convergence. An exemplary computing device may use a depth regulator to determine a depth associated with a stereoscopic view. Moreover, a view converter in the exemplary computing device can transform the stereoscopic view into a monoscopic view with a controlled convergence distance. Further, a display configurator in the exemplary computing device can cause an external object to be displayed in the monoscopic view.

20 Claims, 8 Drawing Sheets

(51) Int. Cl.
*H04N 13/359* (2018.01)
*G06T 11/60* (2006.01)

(56) References Cited

U.S. PATENT DOCUMENTS

| | | |
|---|---|---|
| 2011/0050869 A1 | 3/2011 | Gotoh et al. |
| 2011/0304618 A1 | 12/2011 | Chen et al. |
| 2012/0139906 A1 | 6/2012 | Zhang et al. |
| 2014/0108930 A1* | 4/2014 | Asnis .................. G06F 3/04815 715/716 |
| 2016/0007014 A1 | 1/2016 | Hendershot |
| 2016/0012643 A1 | 1/2016 | Kezele et al. |

OTHER PUBLICATIONS

B. Eichenlaub, Jesse, "Passive method of eliminating accommodation/convergence disparity in stereoscopic head mounted displays", In Proceedings of Stereoscopic Displays and Virtual Reality Systems XII, vol. 5664, Mar. 22, 2005, 10 pages.

Kramida, et al., "Resolving the Vergence-Accommodation conflict in Head Mounted Displays", Published on: Feb. 28, 2016 Available at: https://www.cs.umd.edu/sites/default/files/scholarly_papers/Kramidarev.pdf.

* cited by examiner

PRIOR ART

OBJECT DISPLAY UTILIZING MONOSCOPIC VIEW WITH CONTROLLED CONVERGENCE

CROSS-REFERENCE TO RELATED APPLICATIONS

This application claims priority to U.S. Provisional Application Ser. No. 62/369,150, filed Jul. 31, 2016, entitled "OBJECT DISPLAY UTILIZING MONOSCOPIC VIEW WITH CONTROLLED CONVERGENCE," which is incorporated herein by reference in its entirety.

BACKGROUND

User interface (UI) facilitates interactions between users and machines. Users use UI to operate machines, while machines may provide feedback to users via UI. Graphical user interface (GUI) is a type of UI that allows users to interact with machines, e.g., through graphical icons and visual indicators. Traditional GUI is displayed on a two-dimensional (2D) setting. 2D refers to objects or images that show only two dimensions, while three-dimensional (3D) refers to objects or images that show three dimensions.

Virtual reality (VR) is computer-simulated reality that replicates an environment using computing technologies and simulates a user's physical presence and environment, e.g., to enable user interaction with the VR to an extent. Partially because depth is added as a factor in VR's 3D environment, VR can yield a highly immersive experience. The depth factor is commonly implemented by forcing the eyes to converge differently for virtual objects at different distances.

It is often problematic to insert a 2D object into a 3D environment. By way of example, inserting an object of 2D GUI into 3D VR may break the user's immersive experience by requiring the eyes to converge at a new location with a different depth. On the other hand, the newly inserted 2D GUI may be unexpectedly embedded into a 3D object. Conversely, the newly inserted 2D GUI may block another 3D object.

SUMMARY

In various aspects, systems, methods, and computer-readable storage devices are provided to display objects utilizing a monoscopic view with controlled convergence. One aspect of the technology described herein is to improve computer technology for inserting a 2D or 3D object into a 3D view. Another aspect of the technology described herein is to improve computer technology for determining a suitable depth, direction, and size for inserting the new object. Yet another aspect of the technology described herein is to improve computer technology for providing improved user experience associated with computer graphics.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is illustrated by way of example and not limitation in the accompanying figures in which like reference numerals indicate similar elements and in which.

DETAILED DESCRIPTION

The various technologies described herein are set forth with sufficient specificity to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

UI is integral to many virtual experiences. By way of example, a viewer is focusing at a particular object in a particular distance in a VR setting and wishes to bring up a UI for interaction. Inserting a UI object in a VR setting requires determining a depth for the UI object. Simply bringing up the UI at a fixed distance may yield discomfort issues as the eyes may have to change convergence distance to focus on the UI. On the other hand, placing the UI at the current convergence distance of the viewer may result in UI being embedded in the existing 3D geometry, which may also cause discomfort issues to the viewer due to the mind not accepting the perceived depth of the UI.

As such, one problem with inserting an external object in a 3D view, e.g., placing UI at some distance, is that if this distance is different than what the user was looking at, the eyes have to change convergence distance, which can lead to noticeable discomfort, especially if this occurs frequently. Another problem is that there may be other VR geometry in the vicinity of the UI. The inserted UI may appear to interpenetrate its nearby geometry and possibly cause an uncomfortable disconnection between the UI geometry and its nearby geometry.

One potential solution to solve the issue of embedding is to place the UI in an unoccupied region. However, such unoccupied regions in a view need to be determined in some way. Further, in an experience like Minecraft®, such unoccupied regions may be hard to find due to the fact that the user can put blocks anywhere in the view.

In this disclosure, various technologies are disclosed to solve the aforementioned problems. Specifically, the stereoscopic view (different points of view presented to the left and right eyes) may be transformed to a monoscopic view (the same point of view presented to the left and right eyes), and the external object (e.g., a UI) may be placed in the monoscopic view. Further, at least one image of the monoscopic view may be transformed (e.g., based on one or more 2D transformation techniques), so that the perceived convergence distance of the monoscopic view is near where the eyes are expected to already be converged. Further, monoscopic mode ensures that all visible geometry appears at the same plane or roughly at the same distance from the viewer.

This resolves the discomfort issue related to depth incongruity and the issue of unexpected object interpenetration as the eyes now generally don't have to change convergence distance, and the inserted new object and all existing objects appear at the same convergence distance. Further, the newly inserted object may be placed at a comfortable and convenient direction from the user regardless of other visible geometry. Additionally, the disclosed technology herein applies for any kind of 3D geometry and any kind of 2D or 3D external objects to be inserted into the 3D view.

Figure 1:
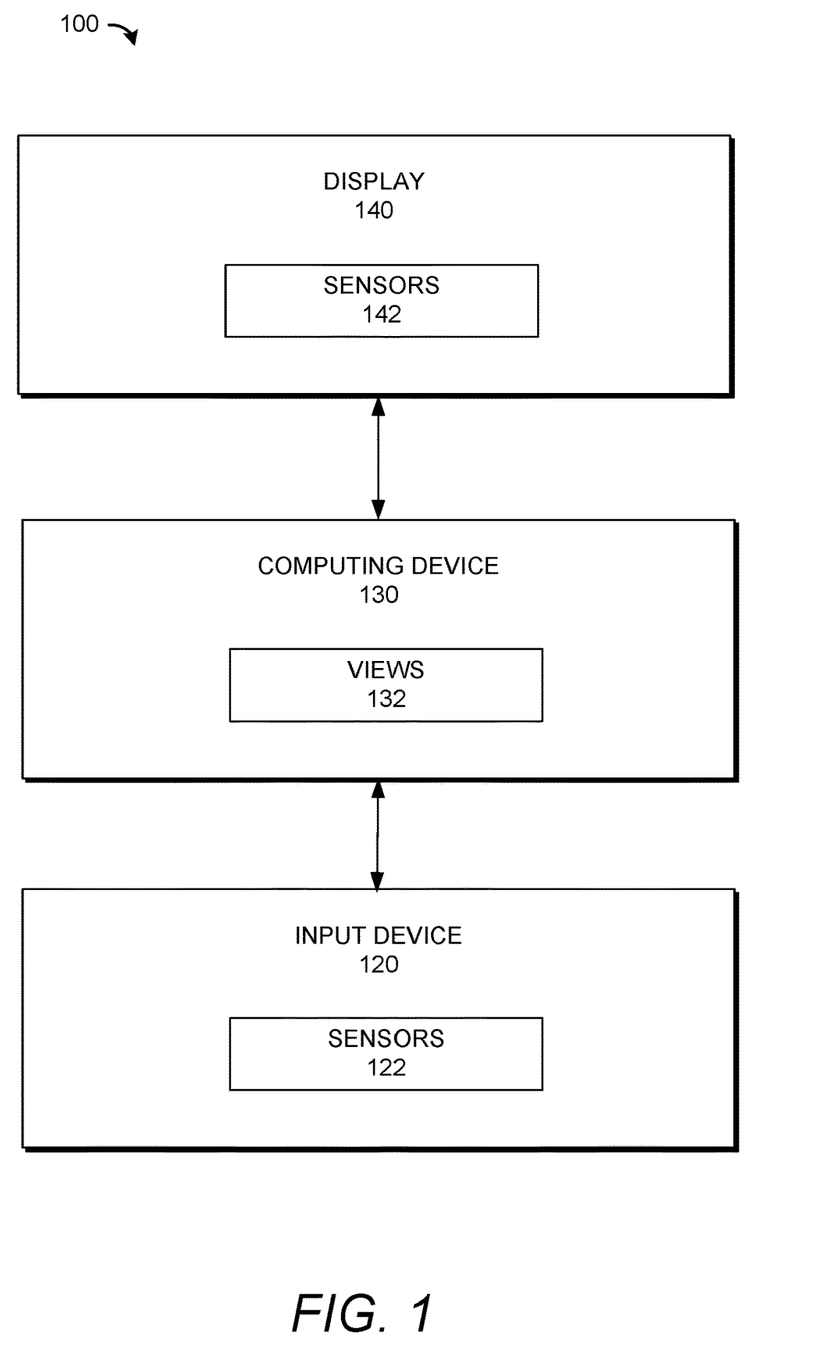
FIG. 1 is a block diagram of an example operating environment suitable for implementing aspects of the present disclosure.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity.

Among other components not shown, example operating environment 100 includes computing device 130, which is configured to insert a 2D or 3D object into a 3D view. In various embodiments, computing device 130 is to transform the 3D view to a monoscopic view with controlled convergence, and insert the 2D or 3D object to the monoscopic view, e.g., at a specific location.

Operating environment 100 also includes input device 120, which generates input signals to computing device 130. Input device 120 enables a user to interact with computing device 130. User input is detected by sensors 122, which may include one or more different types of sensors, such as electric current sensors, potential sensors, magnetic sensors, radio sensors, optical sensors, pressure sensors, proximity sensors, motion sensors, position sensors, environment sensors (e.g., thermal, temperature, or chemical sensors), etc., to detect events or changes in the environment. Input device 120 may be a keyboard, a mouse, a handheld device, a head-mounted device, etc.

In some embodiments, computing device 130 is invoked by the input from input device 120 to insert an external object into a 3D view. In other embodiments, computing device 130 may insert an external object into a 3D view without being prompted by any user input. The computer graphics (e.g., views 132) generated by computing device 130 may be displayed to a user via display 140. Views 132 include 2D views and 3D views, such as a stereoscopic view as well as the monoscopic view converted from the stereoscopic view.

Display 140 presents views 132 to viewers and uses sensors 142 to receive user input and collect user feedback. Sensors 142 may include similar or different types of sensors compared to sensors 122. In some embodiments, sensors 142 may track or otherwise determine the eye focus of a viewer associated with views 132. In some embodiments, display 140 is a wearable device, e.g., a head-mounted displayer. In some embodiments, display 140 and input device 120 are to be integrated into each other, e.g., in a HoloLens® device.

The exemplary operating environment 100 shown in FIG. 1 is an example of one suitable operating environment. In one embodiment, all of the components shown in FIG. 1 may be implemented in one computing device, such as computing device 800 described in connection with FIG. 8, for example. In general, components depicted in FIG. 1 may communicate with each other via a bus (e.g., bus 810 depicted in FIG. 8) or via a network, which may include, without limitation, local area networks (LANs), wireless local area networks (WLANs), cellular networks, or wide area networks (WANs).

Figure 2:
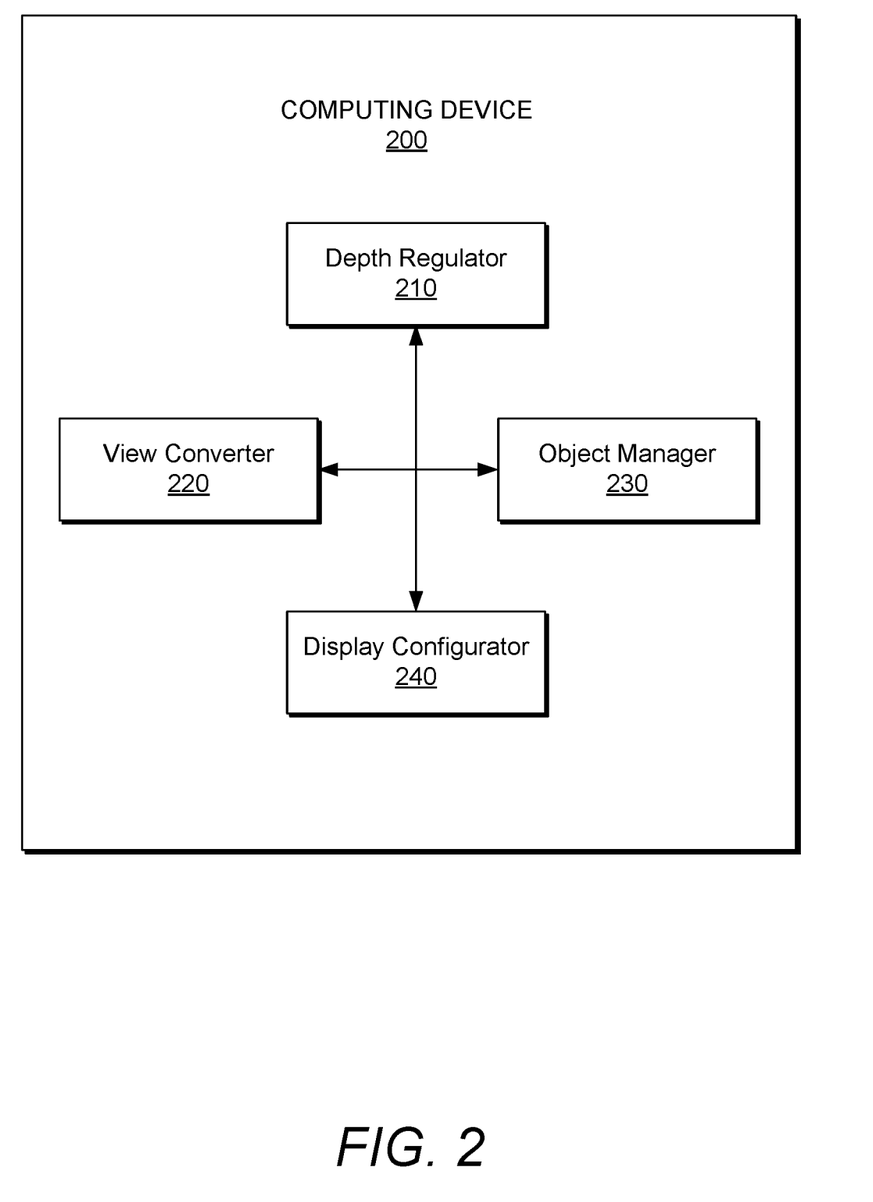
FIG. 2 is a block diagram depicting an example computing device suitable for implementing aspects of the present disclosure.

Referring now to FIG. 2, a block diagram is provided showing an exemplary computing device suitable for implementing one or more aspects of the present disclosure. The exemplary computing device is designated generally as device 200. Device 200 includes system components of depth regulator 210, view converter 220, object manager 230, and display configurator 240, communicatively coupled to each other.

Depth regulator 210 may determine a depth based on a characteristic associated with a stereoscopic view. A characteristic associated with the stereoscopic view refers to a measurable or identifiable property (e.g., a special quality or identity) associated with the stereoscopic view. In some embodiments, the characteristic associated with the stereoscopic view is a perceived convergence distance of a viewer, a viewing direction of the viewer, or a depth of one of the internal objects in the stereoscopic view. The perceived convergence distance of the viewer or the viewing direction of the viewer may be determined based on sensors 142 of FIG. 1. Sensors may track the eye focus of the viewer. Accordingly, convergence distance of the viewer or the viewing direction of the viewer may be determined based on the eye focus of the viewer. By way of example, the viewer may look at a particular object in the stereoscopic view with a known depth parameter. In this case, the perceived convergence distance of the viewer can be derived from the known depth of the particular object. Similarly, based on the viewpoint of the viewer and the location of the particular object, the viewing direction of the viewer can also be determined. In one embodiment, the viewing direction of the viewer may be estimated based on the head position of the viewer, as it is presumed that people usually like to look ahead.

In some embodiments, the eye focus may be derived by tracking the line of sight of the viewer, e.g., based on the positions of the eyes. In this case, convergence distance of the viewer or the viewing direction of the viewer may be determined based on the positions of the eyes.

In one embodiment, the characteristic associated with the stereoscopic view is a gaze cursor, which is displayed in the stereoscopic view to indicate the whereabouts of the eye focus of the viewer. The gaze cursor may be a feature provided by computing device 130 of FIG. 1 or device 200 in FIG. 2. In some embodiments, the gaze cursor may be derived from the head position of the viewer. The gaze cursor can be determined based on the gaze direction, e.g., the forward direction of the head-mounted device (e.g., a headset). As an example, a game is played primarily via interaction using a gaze cursor. In this case, the player's actual gaze is likely near the gaze cursor. In other words, a reasonable assumption may be made that the user is probably focusing at the object near the gaze cursor. The depth parameter of the object near the gaze cursor usually can be retrieved from the game.

In some embodiments, the characteristic associated with the stereoscopic view is a genre, a game type, a scene type, a game level, a layout, a color scheme, etc., associated with the stereoscopic view. Accordingly, depth regulator 210 may be configured to determine the depth based on the genre, the game type, the scene type, the game mode, the game level, the layout, the color scheme, etc., associated with the stereoscopic view. As an example, depth regulator 210 may use the depth related to the main character shown in the stereoscopic view when the genre of the stereoscopic view is a movie. As another example, depth regulator 210 may select different depths to show a game UI object based on the game mode, such as depending on whether the game is in a survival mode, hardcore mode, creative mode, adventure mode, or spectator mode in a Minecraft® game. As yet another example, depth regulator 210 may determine the depth based on the layout of the stereoscopic view. For instance, the layout may include a unique object (e.g., sky) occupying a large portion of the view. In this case, depth regulator 210 may use a predetermined depth (e.g., 5 meters) to show a UI object on or near the unique object.

Object manager 230 may determine a 2D or 3D object to be inserted into the stereoscopic view. In some embodiments, object manager 230 determines the new object to be inserted into the stereoscopic view based on the context of the view. As an example, during the game level change, a UI object related to a set of new options may be inserted into the view. In some embodiments, object manager 230 is configured to determine the new object based on user input. As an example, sensors 122 in FIG. 1 may detect a particular user input, e.g., a particular gesture, which may trigger object manager 230 to select a corresponding object and insert it into the view. The new object may be a menu, a graphical object, an icon, a 3D object, etc. The new object may also be referred to as the external object in relation to internal objects already displayed in the stereoscopic view.

Further, view converter 220 can transform the stereoscopic view to a monoscopic view with a controlled convergence distance. The controlled convergence distance may also be referred to as the target convergence distance. The controlled convergence distance may be determined based on the depth provided by depth regulator 210. In some embodiments, the depth parameter provided by depth regulator 210 is used as the target convergence distance, so that the monoscopic view may appear at the distance where the eyes of the viewer are already converged. In some embodiments, view converter 220 sets the convergence distance to be a predetermined value or within a predetermined threshold from the depth provided by depth regulator 210. The predetermined value or threshold may be determined based on a characteristic associated with the stereoscopic view. By way of example, the viewer may look straight up at the sky or straight down at a deep hole in the stereoscopic view in a VR setting. The depth parameter may be undetermined for the sky or the hole. Further, it may be undesirable to insert the external object in the sky or in the hole. In this case, view converter 220 may select a predetermined value (e.g., 7 feet from the viewpoint) as the desirable convergence distance.

The stereoscopic view involves different points of view, while the monoscopic view involves only a single point of view. In some embodiments, this transformation from the stereoscopic view to the monoscopic view may start with providing only one image associated with the stereoscopic view to both eyes. Further, view converter 220 applies a 2D transformation to at least one image associated with the monoscopic view to achieve the desired convergence distance for the viewer.

Most common geometric transformations that keep the origin fixed are linear, including rotation, scaling, shearing, reflection, and orthogonal projection. A transformation that slants the shape of an object is called shear transformation. View converter 220 may apply a kind of shear transformation to one or both images associated with the monoscopic view to achieve the target convergence distance. For instance, horizontal shear may be applied along the depth axis to achieve congruence at a specific convergence distance.

Alternatively, one or both images may be shifted to achieve the target convergence distance. As an example, the stereoscopic view may be rendered into a 2D plane. The same 2D image or the same 2D plane may be shown to both eyes. Further, one or both images may be shifted relative to each other to achieve the target convergence distance. In other embodiments, other 2D techniques may be used to provide the distance compensation in order to achieve a controlled convergence distance.

In some embodiments, 3D transformation techniques may also be used to transform the stereoscopic view to a monoscopic view with a controlled convergence distance. Like 2D shear, the stereoscopic view may be sheared along the X-axis, Y-axis, or Z-axis in 3D. A transformation matrix may be used to shear the stereoscopic view, and then the sheared image can be used for the monoscopic view. Using appropriate shear matrixes, the entire image may be shifted visually to the left or the right, so that a target convergence distance can be achieved.

Display configurator 240 may display the external object in the monoscopic view. In various embodiments, display configurator 240 is to configure the external object and the internal objects in the stereoscopic view to be displayed on the same plane. The monoscopic view may be presented on the same plane. In one embodiment, the monoscopic view may be presented in a curved surface. In this case, the external object to be inserted and the internal objects in the stereoscopic view may be displayed substantially at the same distance from the viewer.

Display configurator 240 can further determine a location of the monoscopic view to display the external object, e.g., based on the characteristic associated with the stereoscopic view. By way of example, the characteristic associated with the stereoscopic view is the viewing direction of the viewer. In this case, the user interface object to be inserted may be presented along the viewing direction of the viewer.

Display configurator 240 can further determine a size for displaying the external object, e.g., based on the convergence distance. Adjusting the size of the external object in the monoscopic view according to the convergence distance may keep the external object occupying a certain degree of or a predetermined ratio of a field of view. A constant percentage of the field of view means mathematically that the external object scales linearly with the convergence distance. For example, the size of the external object may be increased when the convergence distance is long. Vice versa, the size of the external object may be decreased when the convergence distance is short.

Many of the system components described herein are functional entities that may be implemented as discrete or distributed components or in conjunction with other components, and in any suitable combination and location. Further, various functions described herein as being performed by one or more system components may be carried out by hardware, firmware, and/or software. For instance, some functions may be carried out by a processor executing instructions stored in memory.

Figure 3:
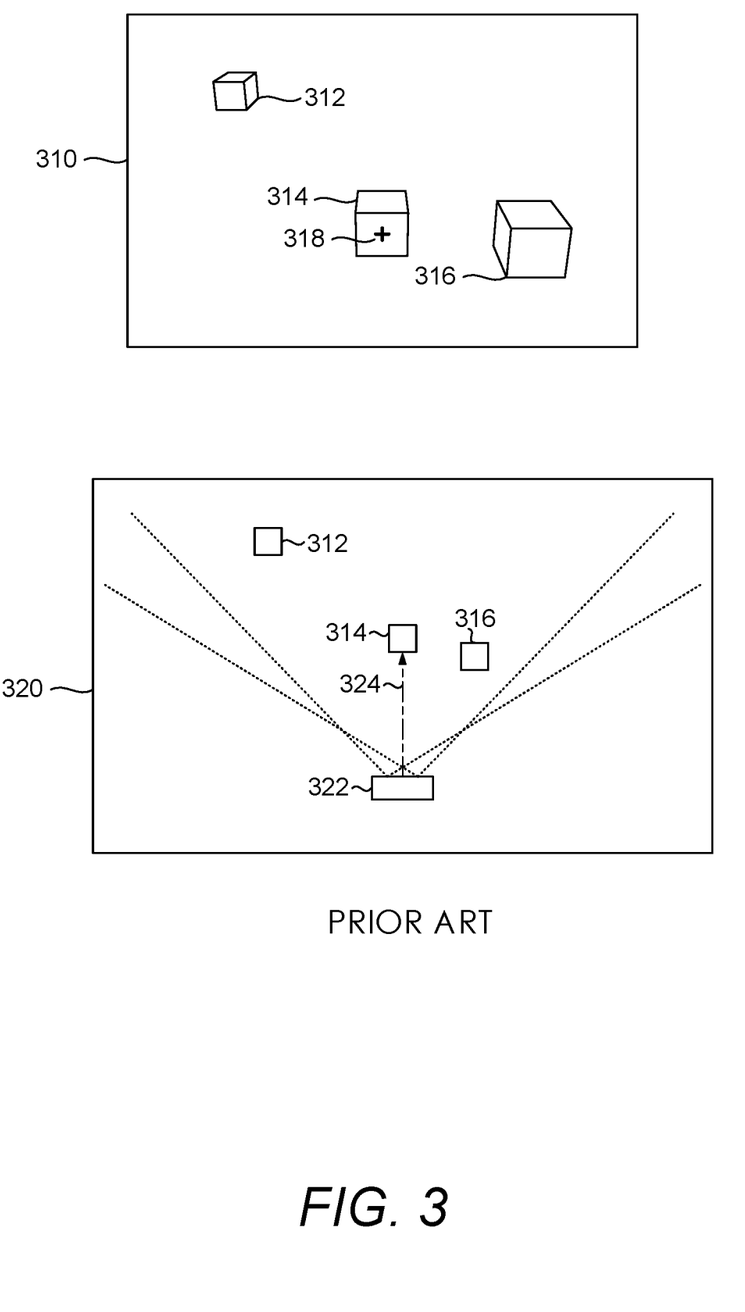
FIG. 3 is an illustrated diagram depicting a stereoscopic view.

Referring now to FIG. 3, a block diagram is provided depicting a stereoscopic view. Stereoscopic view 310 may be created by the stereoscopy technique that enhances the illusion of depth of objects in the view by means of stereopsis for binocular vision. Most stereoscopic methods present two 2D offset images separately to the left and right eye of the viewer. The two 2D offset images can then be combined in the brain to create the perception of 3D depth.

There are several 3D objects depicted in stereoscopic view 310. The viewer perceives different 3D depth for 3D object 312, 3D object 314, and 3D object 316 in this case. Further, gaze cursor 318 shows that the viewer is currently looking at 3D object 314. In the gaming context, stereoscopic view 310 may be a first-person perspective, which refers to a graphical perspective rendered from the viewpoint of the player. Accordingly, gaze cursor 318 may be derived from the head position of the player or the eye focus of the player.

Top-down perspective 320 shows the same group of 3D objects from above. Further, top-down perspective 320 also shows the position of viewpoint 322. By way of example, view point 322 may reflect a head-mounted viewing device. Top-down perspective 320 depicts depth 324 for 3D object 314. Depth 324 reflects the depth of 3D object 314 perceived by the viewer.

Figure 4:
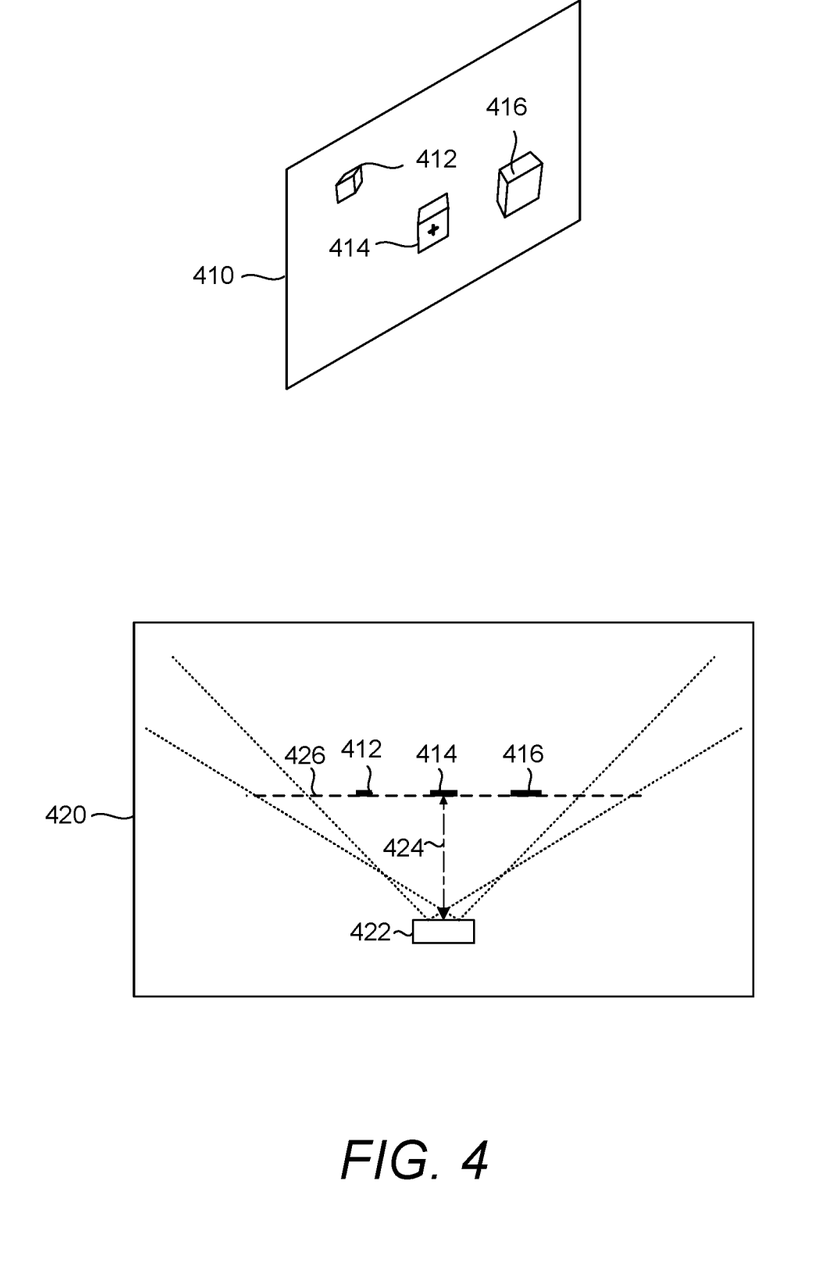
FIG. 4 is an illustrated diagram depicting a monoscopic view for implementing aspects of the present disclosure.

Referring now to FIG. 4, a block diagram is provided depicting a monoscopic view. Monoscopic view 410 is transformed from stereoscopic view 310, e.g., by view converter 220. In this case, 3D object 312, 3D object 314, and 3D object 316 have been transformed to 2D object 412, 2D object 414, and 2D object 416, respectively. As shown in top-down perspective 420, from viewpoint 422, 2D object 412, 2D object 414, and 2D object 416 are lined up on the same plane.

In various embodiments, transformation techniques may be used to transform the stereoscopic view to a monoscopic view with a controlled convergence distance. In this case, gaze cursor 318 shows that the viewer is currently looking at 3D object 314. Accordingly, the convergence distance may be determined based on gaze cursor 318 and its corresponding depth 324. By way of example, depth 324 may be used as the controlled convergence distance to transform every object in stereoscopic view 310 to appear on a same plane with a similar distance from the viewer in monoscopic view 410. In this way, the eyes of the viewer do not need to change convergence distance as the eyes are already converged at depth 324.

Top-down perspective 420 shows that 2D object 414 resides at a distance 424 from viewpoint 422. In one embodiment, distance 424 is equivalent to depth 324. Top-down perspective 420 shows that all 2D objects are being placed on the same plane 426. In some embodiments, plane 426 may be curved and cause all objects to appear at the same distance from viewpoint 422.

Monoscopic view 410 may be created by providing a same image to both eyes of the viewer. Further, numerous 2D transformation techniques may be applied to one or both images to cause the image to appear at a certain distance from the eyes. A transformation that slants the shape of an object is called shear transformation. By way of example, horizontal shear may be applied to one or both images along the depth axis to achieve congruence at a specific convergence distance.

In some embodiments, one or both images may be shifted to achieve congruence at a specific convergence distance. As an example, the stereoscopic view may be rendered into a 2D plane. The same 2D image or the same 2D plane may be shown in both eyes. Further, one or both of the 2D images may be shifted relative to each other to achieve the target convergence distance. In other embodiments, other 2D techniques may be used to provide the distance compensation in order to achieve a controlled convergence distance in the transformation process.

Figure 5:
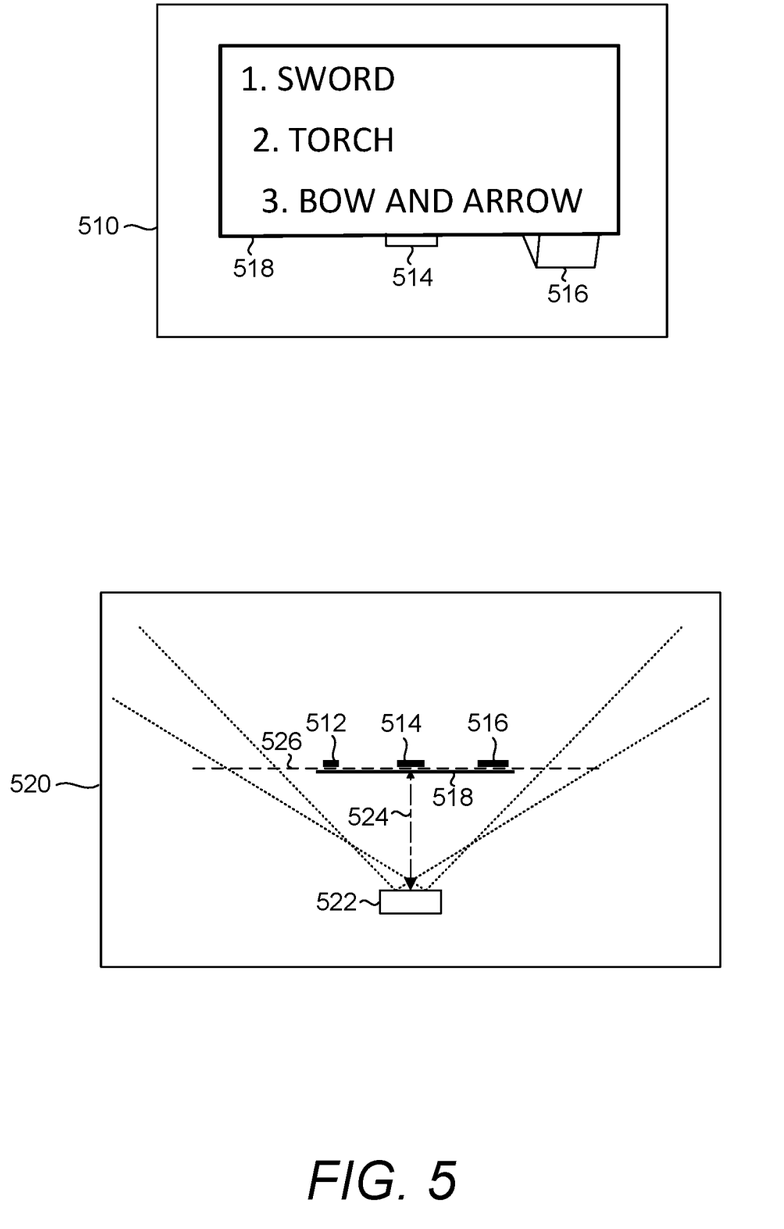
FIG. 5 is an illustrated diagram depicting a monoscopic view with an inserted object for implementing aspects of the present disclosure.

Referring now to FIG. 5, a block diagram is provided depicting a monoscopic view with an inserted external object for implementing aspects of the present disclosure. Continuing with the discussion of FIG. 3 and FIG. 4, monoscopic view 510 is transformed from stereoscopic view 310, e.g., by view converter 220. In this case, 3D object 312, 3D object 314, and 3D object 316 have been converted to 2D object 512, 2D object 514, and 2D object 516, respectively. Meanwhile, menu 518 is inserted into monoscopic view 510. As shown in top-down perspective 520, from viewpoint 522, 2D object 512, 2D object 514, 2D object 516, and menu 518 are being placed on the same plane 526, which has a distance 524 from viewpoint 522.

In some embodiments, depth 324 in FIG. 3 may be used as the controlled convergence distance to transform every object in stereoscopic view 310 to appear on the same plane with a similar distance from the viewer in monoscopic view 510. In one embodiment, distance 524 may be the same as depth 324. As menu 518 also appears on plane 526, the eyes of the viewer do not need to change convergence distance to read menu 518. Advantageously, from viewpoint 522, the viewer can instantly focus on menu 518 without much effort.

Figure 6:
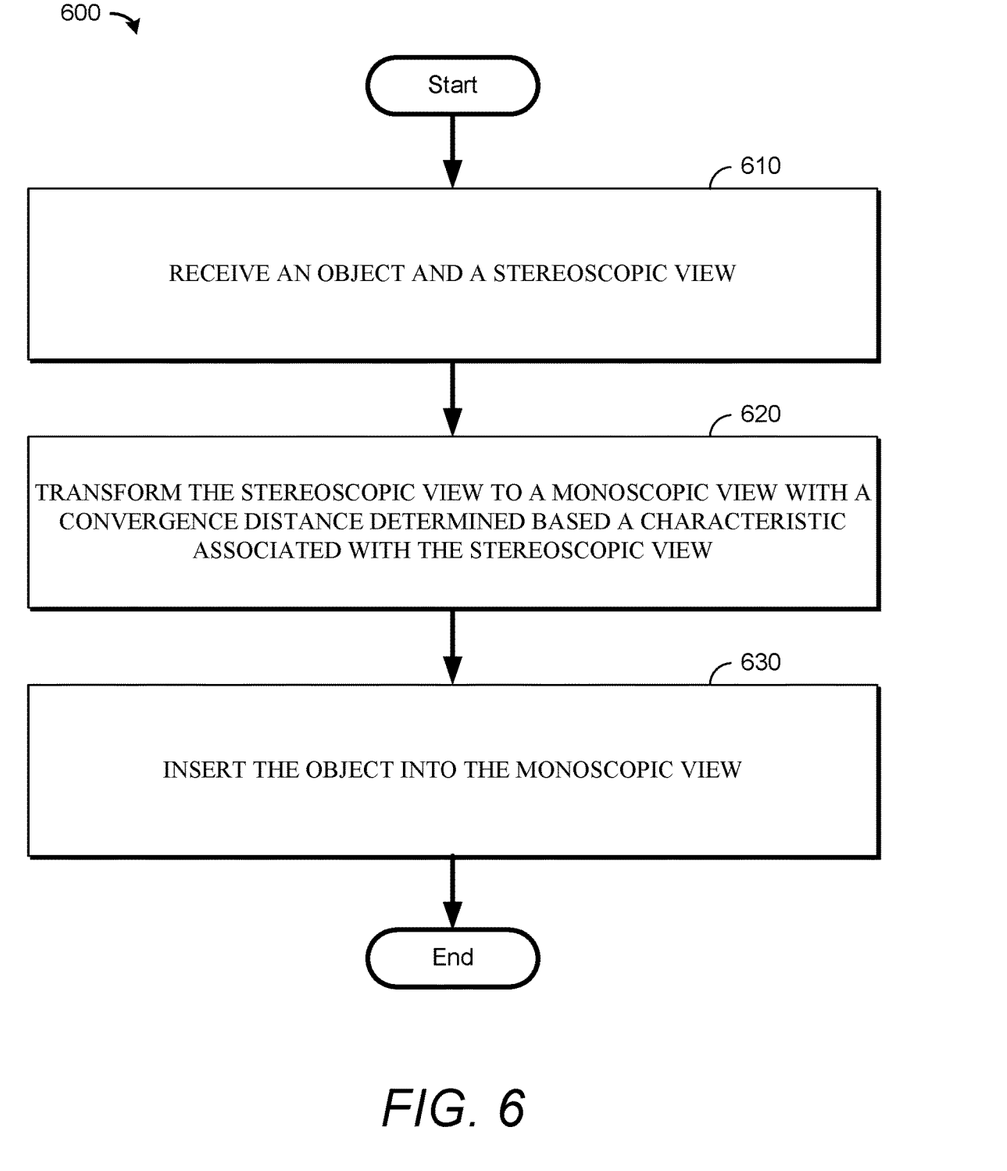
FIG. 6 is a flow diagram showing an exemplary process of inserting an object utilizing a monoscopic view, in accordance with an aspect of the technology described herein.

Turning now to FIG. 6, a flow diagram is illustrated showing an exemplary process of displaying an object utilizing monoscopic view, in accordance with an aspect of the technology described herein. Process 600 may be performed by one or more computing devices, such as device 200 of FIG. 2. In various embodiments, process 600 may be operated in a computing environment, such as operating environment 100 of FIG. 1.

At block 610, the process is to receive an object and a stereoscopic view. The object may be a 2D object, e.g., a user interface for displaying a set of options to the user. The stereoscopic view may be a scene in a VR setting. The object may be contextually related to the stereoscopic view, but is not shown in the stereoscopic view.

At block 620, the process is to transform the stereoscopic view to a monoscopic view with a convergence distance determined based on a characteristic associated with the stereoscopic view. In some embodiments, this transformation from the stereoscopic view to the monoscopic view may start with preparing a same image associated with the stereoscopic view to both eyes of the viewer, and apply a 2D transformation to at least one image to achieve the target convergence distance for the viewer.

The target convergence distance may be determined based on a characteristic associated with the stereoscopic view. In various embodiments, characteristics associated with the stereoscopic view include the internal properties related to the stereoscopic view, such as the general genre of the view (e.g., related to 3D modeling, 3D rendering, 3D computer-aided design, etc.), the general purpose of the view (e.g., analytic, scientific, industrial, etc.), the general field of the view (e.g., engineering, manufacturing, management, 3D printing, architectural design, etc.), the application type of the view (e.g., game, presentation, movie, etc.), or other aspects associated with the stereoscopic view, e.g., a particular scene in a game, a game level, the layout of the view, the color scheme of the view, etc.

In various embodiments, the characteristics of the stereoscopic view may also relate to the present or recent user interactions with the stereoscopic view, such as the present eye focus of the user in the stereoscopic view (e.g., the viewing direction, the object being focused on, etc.), the user's input to the stereoscopic view (e.g., selecting, grabbing, moving, changing, or other interaction with an object in the stereoscopic view), etc. In some embodiments, the characteristic associated with the stereoscopic view includes the perceived convergence distance of a viewer, the viewing direction of the viewer, or the depth of an internal object.

In various embodiments, the characteristics of the stereoscopic view may also relate to the predicted properties with the stereoscopic view, such as the predicted next user interaction with the stereoscopic view, or the predicted next stereoscopic view would be shown. In some embodiments, such predictions are based on machine learning, artificial intelligence, or other techniques.

Different characteristics may require different convergence distances when the stereoscopic view is transformed to a monoscopic view. By way of example, in a 3D game, the target convergence distance to insert a UI object may be determined based on the present eye focus of the player. However, in a 3D architectural design application, the target convergence distance to insert UI may be determined based on the presently selected task or tool. For instance, UI related to roof design may need a convergence distance based on the location of the roof. UI related to pipe design may need a convergence distance based on the location of the pipe.

At block 630, the process is to insert the object into the monoscopic view. Different stereoscopic views may require different methods to insert the object into the monoscopic view. As an example, if the stereoscopic view is about a presentation, the location to insert UI may be preselected to be on the top of the view, which corresponds to how a menu would normally be placed in a computer program.

In various embodiments, the external object is to be overlaid over other existing internal objects of the stereoscopic view, so that the external object is fully visible to the viewer without blocking. Specifically, the external object may be drawn on top of the monoscopic view. In this way, the external object will appear at the targeted convergence distance, and there is no discomfort to the viewer due to nearby geometry appearing to have the embedded external object.

In some embodiments, the inserted object is a 3D object. The technique disclosed herein also applies to overlaying the 3D object to the stereoscopic view. The stereoscopic view can still be transformed into a monoscopic view. The process is generally the same, but another stereoscopic view may be generated for the 3D object, and the monoscopic view of the previous stereoscopic view can be placed in a plane of the new stereoscopic view. This plane may be set at the target convergence distance. The 3D object may be placed before, near, on, or even after the plane for hosting the monoscopic view. Generally, it is desirable to place the 3D object on top of any existing objects, so that the inserted new object is fully visible and not blocked by other existing objects. In some embodiments, the centroid of the 3D object may be placed on the same plane as the monoscopic view, so that the viewer does not have to refocus.

Figure 7:
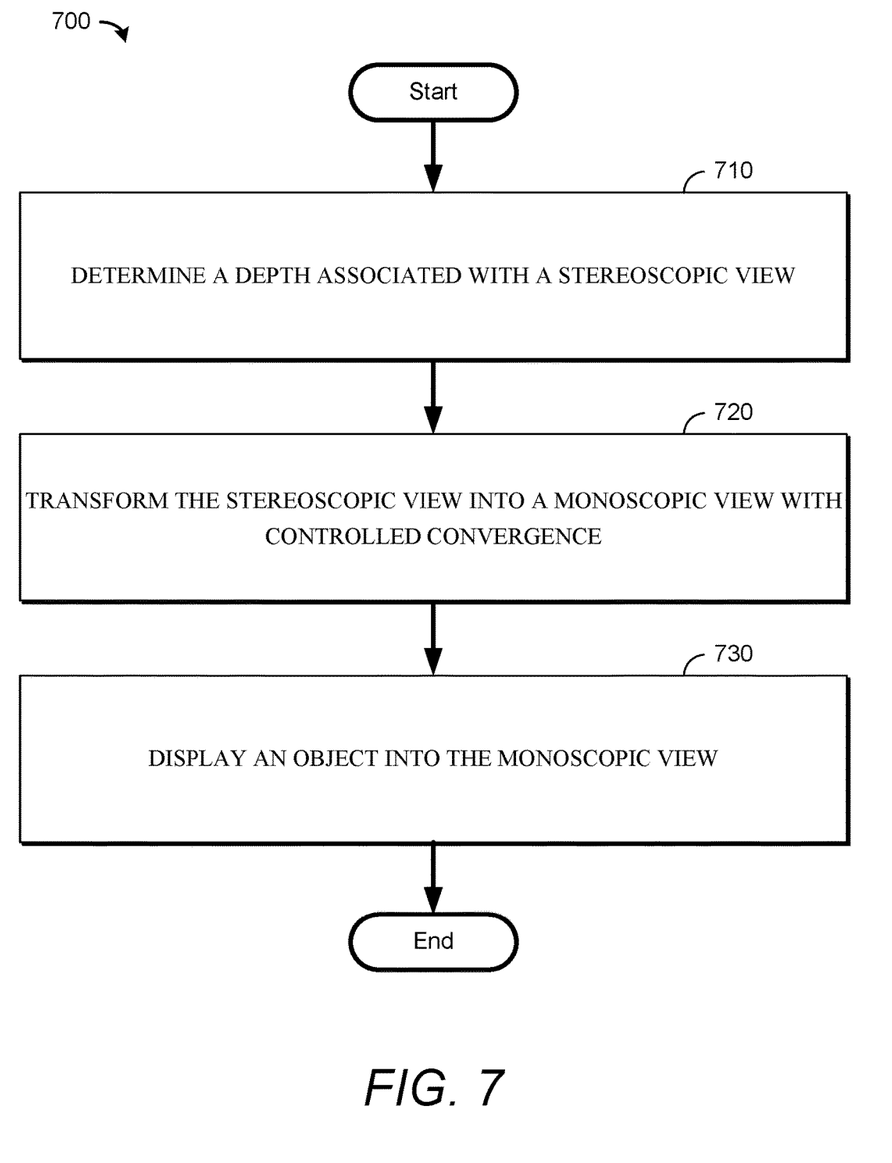
FIG. 7 is a flow diagram showing another exemplary process of inserting an object utilizing a monoscopic view, in accordance with an aspect of the technology described herein.

Turning now to FIG. 7, a flow diagram is illustrated showing an exemplary process of displaying an object utilizing monoscopic view, in accordance with an aspect of the technology described herein. Process 700 may be performed by one or more computing devices, such as device 200 of FIG. 2. In various embodiments, process 700 may be operated in a computing environment, such as operating environment 100 of FIG. 1.

At block 710, the process is to determine a depth parameter associated with a stereoscopic view, e.g., by depth regulator 210 of FIG. 2. The depth parameter may be determined based on a characteristic associated with the stereoscopic view. In some embodiments, the characteristic associated with the stereoscopic view is a perceived convergence distance of a viewer, a viewing direction of the viewer, or a depth of one of the internal objects already existing in the stereoscopic view.

In some embodiments, a default convergence distance may be chosen based on the context of the stereoscopic view, e.g., at around 5 meters away from the viewer, as a comfortable convergence distance to the viewer. As an example, if the viewer is looking at the infinity (e.g., the sky) in the stereoscopic view, then a default convergence distance (e.g., 5 meters) may be used as a comfortable distance to insert a UI object. As another example, if the viewer is looking down at an object, the vector from the viewer to the object may be used to get the forward vector, which is the forward projection of the vector from the viewer, thus causing the forward vector to have a direction that is straight in front of the user. In this case, the length of the forward vector may be used to determine the target convergence distance.

At block 720, the process is to transform the stereoscopic view into a monoscopic view with controlled convergence based on the depth parameter. The transformation process may involve presenting the same image associated with the stereoscopic view to both eyes of the viewer and applying a 2D transformation to at least one image to achieve the controlled convergence distance for the viewer. In one embodiment, this transformation process starts by switching the ongoing game to its monoscopic mode (e.g., drawing the same image for both eyes). Meanwhile, by slewing the images closer together, the player's eyes will be forced to converge at a target convergence distance, e.g., based on the depth parameter determined at block 710.

At block 730, the process is to insert an object into the monoscopic view. The object may be an external object that has not been presented in the stereoscopic view, e.g., a UI object. In various embodiments, as the external object appears at the controlled convergence distance from the viewer (e.g., near where the eyes are expected to already be converged), the viewer does not need to change his or her convergence distance. This results in comfort for the viewer and a more integral user experience. Further, the monoscopic view can ensure all visible geometry appear on the same plane. This may reduce or eliminate any depth incongruity discomfort issue for the viewer. Even further, the inserted external object may be placed on top of other existing internal objects even though all existing geometry will appear at the same converged distance. This avoids visual disturbance caused by embedding the external object into the existing internal objects of the stereoscopic view.

Figure 8:
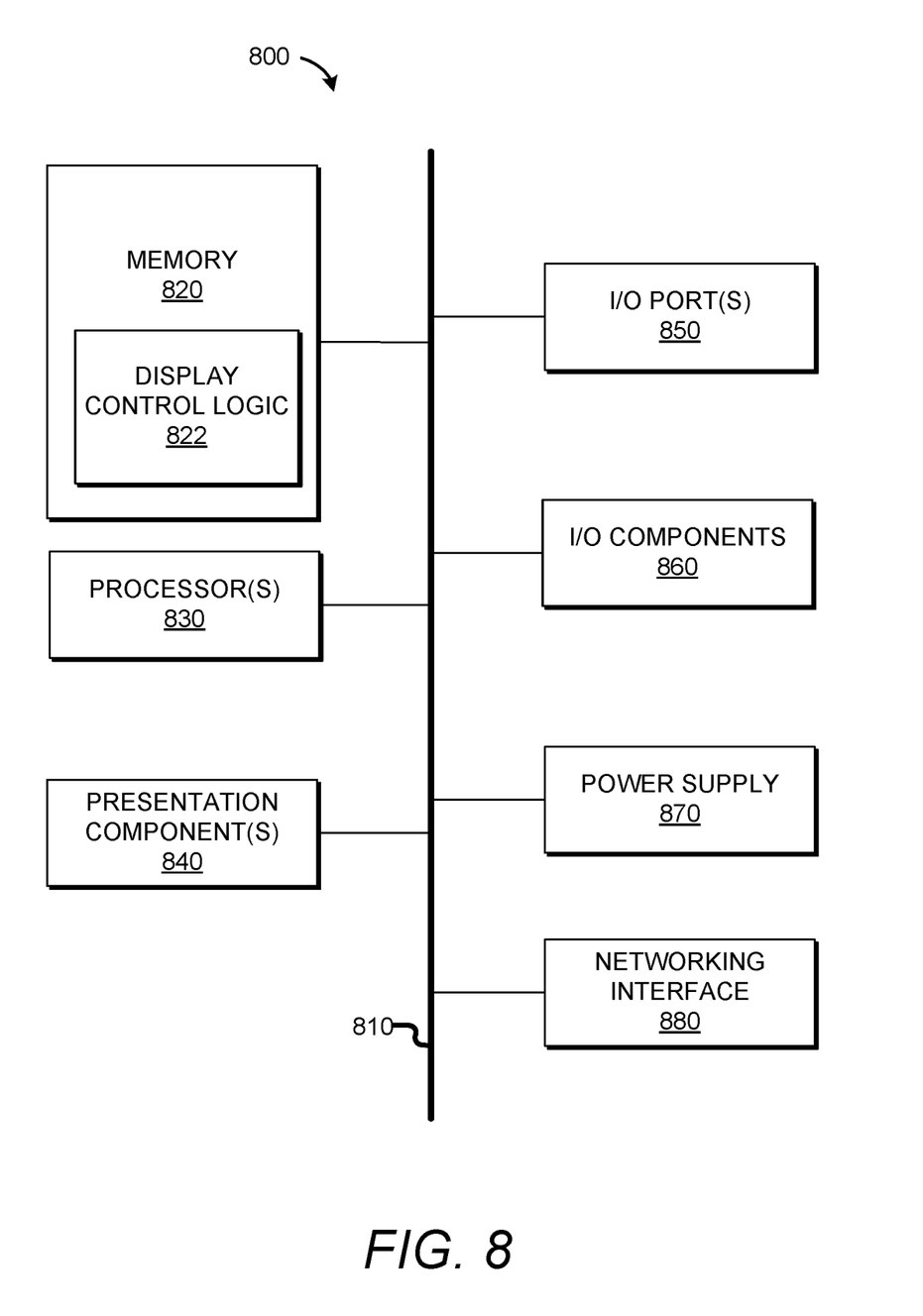
FIG. 8 is a block diagram of an exemplary computing environment suitable for use in implementing aspects of the technology described herein.

Referring to the drawings in general, and initially to FIG. 8 in particular, an exemplary operating environment for implementing aspects of the technology described herein is shown and designated generally as computing device 800. Computing device 800 is but one example of a suitable computing environment and is not intended to suggest any limitation as to the scope of use of the technology described herein. Neither should the computing device 800 be interpreted as having any dependency or requirement relating to any one or combination of components illustrated.

The technology described herein may be described in the general context of computer code or machine-useable instructions, including computer-executable instructions such as program components, being executed by a computer or other machine. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are connected through a communications network.

With continued reference to FIG. 8, computing device 800 includes a bus 810 that directly or indirectly couples the following devices: memory 820, one or more processors 830, one or more presentation components 840, input/output (I/O) ports 850, I/O components 860, and an illustrative power supply 870. Bus 810 represents what may be one or more busses (such as an address bus, data bus, or a combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 820 includes computer storage media in the form of volatile and/or nonvolatile memory. The memory 820 may be removable, non-removable, or a combination thereof. Exemplary memory includes solid-state memory, hard drives, optical-disc drives, etc. Computing device 800 includes one or more processors 830 that read data from various entities such as bus 810, memory 820, or I/O components 860. Presentation component(s) 840 present data indications to a user or other device. Exemplary presentation components 840 include a display device, speaker, printing component, vibrating component, etc. I/O ports 850 allow computing device 800 to be logically coupled to other devices, including I/O components 860, some of which may be built in.

In various embodiments, memory 820 includes, in particular, temporal and persistent copies of display control logic 822. Display control logic 822 includes instructions that, when executed by one or more processors 830, result in computing device 800 performing various functions, such as, but not limited to, process 600 or 700. In various embodiments, display control logic 822 includes instructions that, when executed by processor(s) 830, result in computing device 800 performing various functions associated with, but not limited to, depth regulator 210, view converter 220, object manager 230, or display configurator 240 in connection with FIG. 2.

In some embodiments, one or more processors 830 may be packaged together with display control logic 822. In some embodiments, one or more processors 830 may be packaged together with display control logic 822 to form a System in Package (SiP). In some embodiments, one or more processors 830 can be integrated on the same die with display control logic 822. In some embodiments, processors 830 can be integrated on the same die with display control logic 822 to form a System on Chip (SoC).

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 830 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

Computing device 800 may include networking interface 880. The networking interface 880 includes a network interface controller (NIC) that transmits and receives data. The networking interface 880 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 880 may include a wireless terminal adapted to receive communications and media over various wireless networks. Computing device 800 may communicate via wireless protocols, such as Code Division Multiple Access (CDMA), Global System for Mobiles (GSM), or Time Division Multiple Access (TDMA), as well as others, to communicate with other devices via the networking interface 880. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

What is claimed is:

1. A computing system, comprising:
    a depth regulator to determine a depth of one of a plurality of internal objects of a stereoscopic view based on a characteristic associated with the stereoscopic view;
    a view converter, coupled to the depth regulator, to transform the stereoscopic view into a monoscopic view based on a convergence distance associated with the depth; and
    a display configurator, coupled to the view converter, to display at least one external object in the monoscopic view.

2. The computing system of claim 1, further comprising:
    a sensor, coupled to the depth regulator, to track an eye focus of a viewer associated with the stereoscopic view, and wherein the depth regulator is configured to determine the one of the plurality of internal objects based on the eye focus of the viewer.

3. The computing system of claim 1, further comprising:
    an object manager, coupled to the display configurator, to determine the at least one external object.

4. The computing system of claim 3, further comprising:
    a sensor, coupled to the object manager, to receive a user input, wherein the object manager is configured to determine the at least one external object based on the user input.

5. The computing system of claim 1, wherein the view converter is to apply a shear transformation to at least one image associated with the monoscopic view to achieve the convergence distance.

6. The computing system of claim 1, wherein the display configurator is to configure the plurality of internal objects and the at least one external object to be displayed on a same plane.

7. The computing system of claim 1, wherein the characteristic associated with the stereoscopic view is a perceived convergence distance of a viewer, a viewing direction of the viewer, or a default convergence distance associated with the stereoscopic view.

8. The computing system of claim 1, wherein the characteristic associated with the stereoscopic view is a genre, a game type, a scene type, a game level, a layout, or a color scheme associated with the stereoscopic view.

9. The computing system of claim 1, wherein the at least one external object is a user interface object.

10. A computer-implemented method, comprising:
    receiving an external object and a stereoscopic view with a plurality of internal objects;
    transforming the stereoscopic view into a monoscopic view based on a convergence distance associated with a characteristic of the stereoscopic view; and
    inserting the external object into the monoscopic view.

11. The method of claim 10, further comprising:
    tracking an eye focus of a viewer associated with the stereoscopic view; and
    detecting a depth of one of the plurality of internal objects associated with the eye focus.

12. The method of claim 10, further comprising:
    applying a two-dimensional transformation to at least one image associated with the monoscopic view to achieve the convergence distance.

13. The method of claim 10, further comprising:
    determining a location of the monoscopic view to display the external object based on the characteristic of the stereoscopic view; and
    determining a size for displaying the external object in the monoscopic view based on the convergence distance.

14. The method of claim 10, further comprising:
    configuring the external object to occupy a predetermined ratio of a field of view based on the convergence distance.

15. The method of claim 10, further comprising:
    configuring the external object to be displayed without being blocked by any one of the plurality of internal objects.

16. One or more non-transient computer storage media comprising computer-implemented instructions that, when used by one or more computing devices, cause the one or more computing devices to:
    determine a depth of an internal object of a stereoscopic view based on a characteristic of the stereoscopic view;
    transform the stereoscopic view into a monoscopic view based on a convergence distance associated with the depth; and
    display an external object in the monoscopic view.

17. The one or more computer storage media of claim 16, wherein the instructions further cause the one or more computing devices to:
    determine an eye focus of a viewer associated with the stereoscopic view; and
    determine the internal object based on the eye focus.

18. The one or more computer storage media of claim 16, wherein the instructions further cause the one or more computing devices to:
    set the convergence distance to be a predetermined value, wherein the predetermined value is determined based on the characteristic of the stereoscopic view.

19. The one or more computer storage media of claim 16, wherein the instructions further cause the one or more computing devices to:
- configure the internal object and the external object to be displayed on a same plane.

20. The one or more computer storage media of claim 16, wherein the instructions further cause the one or more computing devices to:
- apply a two-dimensional transformation to at least one image associated with the monoscopic view to achieve the convergence distance.

* * * * *